Jan. 31, 1939. T. V. DILLSTRÖM 2,145,250
INTERNAL COMBUSTION ENGINE
Filed May 11, 1937 3 Sheets-Sheet 1
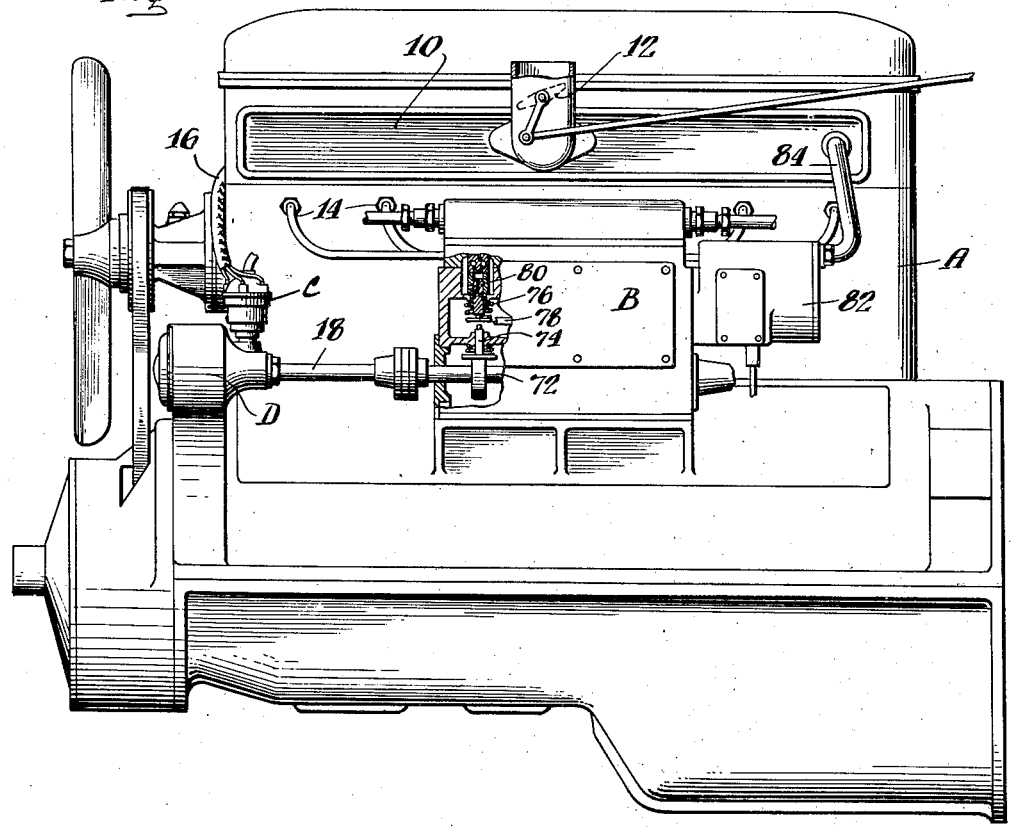
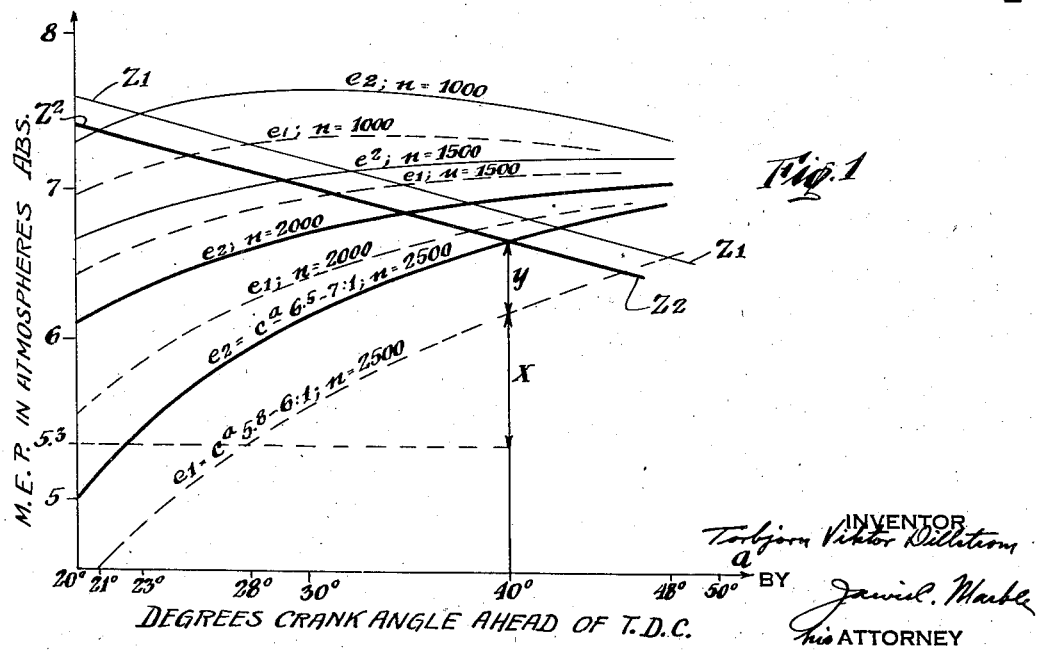

Jan. 31, 1939. T. V. DILLSTRÖM 2,145,250
INTERNAL COMBUSTION ENGINE
Filed May 11, 1937 3 Sheets-Sheet 2
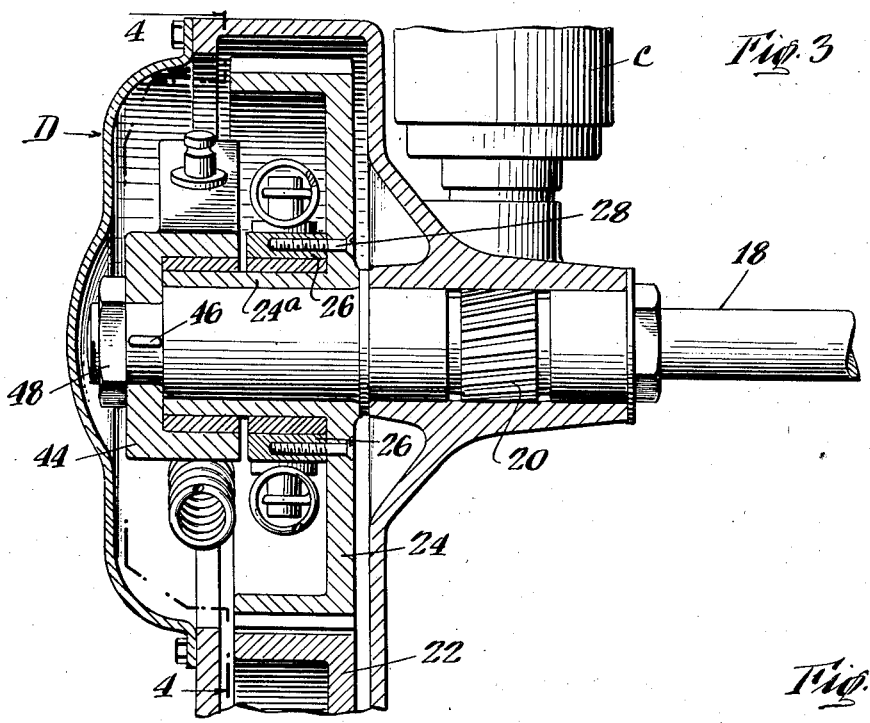
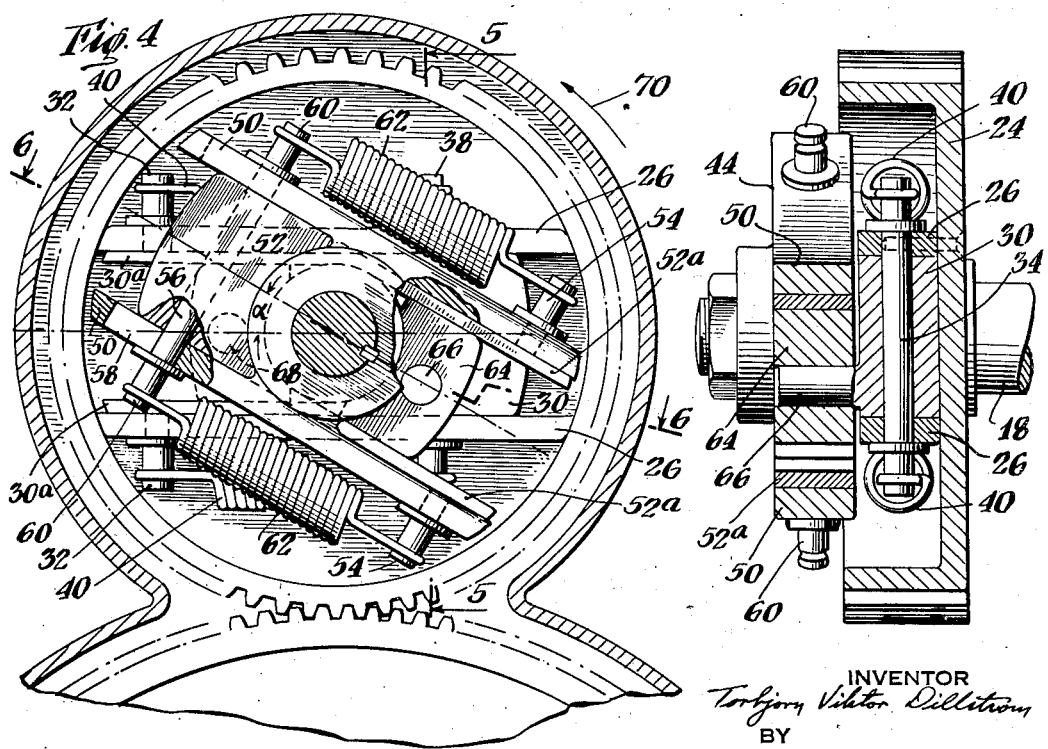
INVENTOR
Torbjörn Viktor Dillström
BY
ATTORNEY Jan. 31, 1939.  T. V. DILLSTRÖM  2,145,250
INTERNAL COMBUSTION ENGINE
Filed May 11, 1937  3 Sheets-Sheet 3

INVENTOR
Torbjörn Viktor Dillström
BY
ATTORNEY

Registered Jan. 31, 1939

2,145,250

UNITED STATES PATENT OFFICE 2,145,250

INTERNAL COMBUSTION ENGINE

Torbjörn Viktor Dillström, Stockholm, Sweden, assignor to Hesselman Motor Corporation, Aktiebolag, Henriksdal, Stockholm, Sweden, a corporation of Sweden Application May 11, 1937, Serial No. 141,926
In Germany May 12, 1936

10 Claims. (Cl. 123—32)

The present invention relates to internal combustion engines and has particular reference to engines of the injection type in which fuel is injected into a compressed air charge to form a fuel-air mixture which is ignited by timed ignition.

The invention has for its general object the improvement of the performance and efficiency of engines of this kind and this general object, in accordance with the invention, is accomplished by novel method and means for controlling the period of fuel injection, either alone or in combination with control of the time of ignition, as will hereinafter be more fully explained.

In internal combustion engines of the above described kind, fuel is injected into and mixed with air previously admitted to the cylinder, the injection occurring before the end of the compression stroke of the piston to form a combustible fuel-air mixture in the cylinder which is ignited by timed ignition, usually by sparks from one or more spark plugs or the like timed to occur at or near the time when the piston is at its upper dead center position.

It is of the greatest importance to the smooth operation of the engine as well as to the life of the engine that ignition should not be premature, that is, ignition should not occur before the proper and accurately timed ignition produced by the timed ignition means.

If ignition should occur due to the heat of compression, spontaneously and at an uncontrolled time before the correct time of ignition, abnormal combustion chamber pressures will be produced, which, not only on account of the magnitude of the pressures but also on account of their occurrence at the wrong time in the engine cycle, greatly reduce the normal life of the engine and in addition materially decrease its efficiency of operation.

One factor which is of greatest importance with respect to self-ignition is the compression ratio of the engine, that is, the ratio of the cylinder volumes at the beginning and end of the compression stroke. The higher the compression ratio, the greater is the tendency for premature self-ignition to take place.

By selecting a sufficiently low compression ratio it is possible to dependably avoid any chance of self-ignition, but the efficiency of the engine is dependent to a great extent on the compression ratio, since a higher ratio results in increase in the power delivered from a given engine and reduces the fuel consumption.

Consequently, the value of the compression ratio which may practically be employed represents in substantially all cases a compromise between a high value which would result in the danger of self-ignition and a low value giving relatively poor engine performance and high fuel consumption.

The tendency to self-ignition of injected fuel also depends, however, as I have found, also on other factors. When the fuel is injected relatively early during the compression stroke, self-ignition is more likely to occur than when the injection is relatively nearly at the end of the compression stroke. On the other hand, however, in engines of the kind under consideration in which the combustible charge is completely or substantially completely formed prior to ignition, early injection up to a certain limit is desirable, since if high efficiency and low fuel consumption are to be obtained, the injection must be sufficiently in advance of ignition to permit the formation of a fuel-air mixture permitting the rapid and complete combustion of all of the injected fuel after the timed ignition takes place. Thus, in view of this factor a further compromise is necessary between the relatively early injection desired to form the most efficiently combustible mixture and the later injection providing assurance against self-ignition.

I, further, have discovered that still another factor has considerable influence on the tendency to self-ignition. This factor is the speed of operation of the engine. At low engine speeds the tendency to self-ignition is much greater than at high engine speeds, other conditions, particularly compression ratio and duration of the time of ignition, being equal.

If an engine is built to run with variable speed it has heretofore been necessary to employ a very low compression ratio or a rather late timing of injection in order to avoid self-ignition at low speeds. When an engine is operated at high speeds this means that it is not so efficient as it could be made if it were built for these high speeds only. I have investigated the relationship between the tendency to self-ignition and the engine speed for several engines with different compression ratios. From these investigations I have drawn the conclusion that the timing of the period of injection should vary with the speed of the engine. My tests show that the time of the period of injection should be later at low engine speeds than is now customary and earlier at high engine speeds. By retarding the injection timing at low engine speeds the tendency to self-ignition is decreased. This means that a higher compression ratio can be used. Starting from low engine speed and late injection with a rather high compression ratio the timing of the period of injection should be advanced with the speed of the engine to more or less accurately follow the curve of self-ignition. I have found that this curve can easily be determined through experiments. In this way an engine can be obtained which at high speeds has a higher compression ratio and an earlier timing of injection than what is now known. In spite of this the tendency to self-ignition at low speeds has not been increased. It is, of course, evident that an improvement in efficiency could be obtained by employing a variable injection timing alone without changing the compression ratio. The best results, however, are obtained by combining the variable timing of injection with an increased compression ratio. On the other hand, fuel injection should not be timed to occur too early in the compression stroke because too early injection may cause dilution of the lubricating oil.

In accordance with the present invention, the various conflicting and contradictory factors are provided for and the maximum performance characteristics for a variable speed engine obtained by controlling the injection in a manner which permits a higher compression ratio to be employed than would otherwise be the case, without risking self-ignition of the fuel mixture at any engine speed within the normal working range of the engine. To this end, the maximum compression ratio is selected for the given conditions and the period of injection is varied in response to variations in engine speed so that the lower the speed, the later the termination of the injection period. The governing of the injection period is further made such that at maximum load, the engine runs in the vicinity of but always below the limiting conditions productive of self-ignition at the speed at which the engine is operating, which limiting conditions can readily be determined for any given engine from the compression ratio and speed characteristics of the engine.

The manner in which the invention operates to secure the desired results, and suitable means for carrying the invention into effect, will now be described in conjunction with the accompanying drawings in which:

Fig. 1 is a diagram illustrative of engine characteristics previously discussed;

Fig. 2 is a side elevation of an engine of the kind under consideration embodying the invention;

Fig. 3 is a vertical section on enlarged scale of the governing device with which the engine of Fig. 2 is equipped;

Fig. 4 is a section taken on the line 4—4 of Fig. 3;

Fig. 5 is a section taken on the line 5—5 of Fig. 4;

Figure 6:
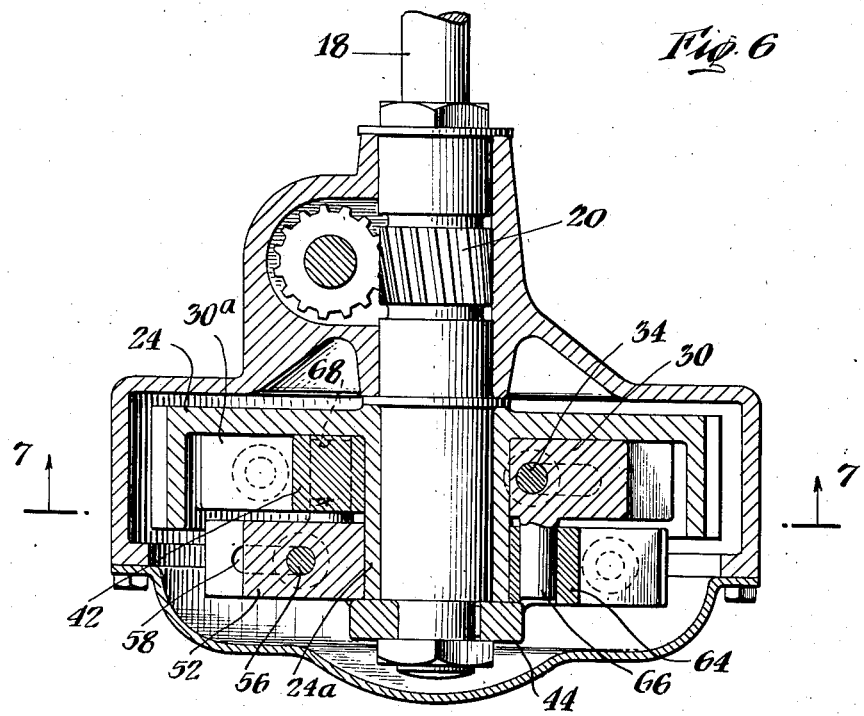
Fig. 6 is a section taken approximately on the line 6—6 of Fig. 4 with the parts in slightly different position from the position shown in Fig. 4.

Referring now to the diagram of Fig. 1, the ordinates represent the mean effective pressure (M. E. P.) developed in the engine cylinder, expressed in atmospheres absolute, and the abscissae represent the timing of the termination of the injection period in degrees of crank angle in advance of top dead center position of the piston on the compression stroke.

On these coordinates the curves $e_1$ and $e_2$ represent the mean effective pressures obtained at different engine speeds ($n$, in R. P. M.) with different compression ratios ($c^a$), the curves $e_1$ being for an engine of the kind under consideration having a compression ratio approximating 5.8 to 6 to 1 and the curves $e_2$ being for an engine having a compression ratio approximating 6.5 to 7 to 1. It may be assumed that the line $Z_1$ represents the limiting conditions productive of self-ignition of injected fuel at maximum engine load for the compression ratio corresponding to curves $e_1$, while the line $Z_2$ represents the corresponding limiting conditions for the compression ratio represented by curves $e_2$. The conditions determinative of these lines are readily ascertained by experiment.

By reference to Fig. 1 it will be observed that the curves $e_1$ and $e_2$ have been drawn to indicate the mean effective pressures at different speeds between 1,000 R. P. M. and 2,500 R. P. M., which for purposes of the present discussion may be considered as the normal working speed ranges of the engines, it being understood however that the invention is not limited to engines having any particular speed range. It will be observed from the diagram that for the compression ratio $e_1$, self-ignition at 1,000 R. P. M. occurs even with injection completed at only 28° before top dead center position of the piston. This has heretofore established that injection has had to be completed not earlier than 28° before top dead center throughout the working range of engine speeds in order to prevent the undesired self-ignition at the speed of 1,000 R. P. M. If the lower limit of the working range of the engine were less than 1,000 R. P. M., completion of injection would have to be even later in the compression stroke in order to avoid self-ignition at engine speeds under 1,000 R. P. M.

With injection limited to completion not earlier than 28° ahead of top dead center, the mean effective pressure obtainable at 2,500 R. P. M. will be only approximately 5.3 atmospheres as will be seen from the diagram. By reference to the curve corresponding to 2,500 R. P. M. for the engine under consideration, it will be observed that at this speed the termination of injection could be advanced to 48° before top dead center before the point of self-ignition occurs and it will further be observed that if the injection were advanced to this extent at the given engine speed, the mean effective pressure obtainable would be approximately 6.5 atmospheres.

When the injection timing is varied in accordance with the present invention however, the advantages obtained by early injection and increased compression ratio, which advantages are reflected in increased mean effective pressure, are secured in the following manner. It is assumed that the variable timing of the injection is regulated so that at all speeds within the normal working range, the conditions represented by the line $Z_2$ will be approximately reached but not or not substantially exceeded, and by reference to the line $Z_2$ and the curves $e_2$ for 1,000 R. P. M. and 2,500 R. P. M. it will be seen that the compression ratio may be raised from the value of $e_1$ to the value of $e_2$ and the injection advanced so that at 2,500 R. P. M. it terminates approximately 40° ahead of top dead center rather than 28° ahead of top dead center as discussed in connection with fixed timing of injection at the lower compression ratio. Under the conditions of variable timing in accordance with the invention and with injection terminating 40° ahead of top dead center at 2,500 R. P. M., injection is terminated at approximately 21° ahead of top dead center at a speed of 1,000 R. P. M., this latter termination of injection at 1,000 R. P. M. compared with the 28° termination of injection at 1,000 R. P. M. previously discussed being due to the increased compression ratio now being considered as compared with the former compression ratio. At a speed of 1,000 R. P. M. injection may be completed as late as 21° ahead of top dead center without encountering difficulties in the formation of a readily ignitible fuel-air mixture in the cylinder.

By making use of the invention, the advantage is gained, in the examples chosen by way of illustration, of increasing the mean effective pressure at 2,500 R. P. M. from the value of approximately 5.3 atmospheres to the value of approximately 6.6 atmospheres.

Of the gain from approximately 5.3 atmospheres to approximately 6.6 atmospheres indicated on the diagram, the increase indicated by $x$ represents the increase obtained due to advancing the time of the injection period, and the increase indicated by $y$ represents the increase obtained due to increasing the compression ratio.

If the injection timing is controlled in accordance with the invention, it will be observed from the diagram that if the compression ratio represented by $e_1$ were retained, injection could be advanced to 48° ahead of top dead center at a speed of 2,500 R. P. M., but more advantage is gained by making use of some increase in compression ratio as well as advance of the time of termination of injection as will be evident from the fact that the line representing the higher compression ratio of $e_2$ intersects the line $Z_2$ at a point giving materially higher value of the mean effective pressure, even though this point of intersection shows that the maximum advance of the time of termination of injection at the given speed must be only approximately 40° rather than approximately 48° as is the case with the lower compression ratio. This condition is generally true for different engines and consequently it may be said that to take the greatest advantage of the present invention, a higher compression ratio should be employed when the timing of injection is varied as compared with the highest compression ratio that could be used with injection having fixed timing.

The Z line for any particular engine is readily determinable and consequently the timing of the injection in accordance with the present invention may be determined without difficulty.

In engines embodying control of the timing of fuel injection in accordance with the present invention, variable timing of the ignition may also be advantageously combined with the variable timing of the injection since advance of the time of ignition upon increase in engine speed is advantageous in the type of injection engine under consideration as well as in the type of engine in which the ignitible mixture to be burned is introduced into the cylinder in the form of a combustible mixture of vaporized fuel and air.

Referring now more particularly to Figs. 2 to 7, suitable apparatus for carrying the invention into effect will be described.

In Fig. 2, the engine indicated generally at A is of known type in which air is drawn into the engine cylinders through an inlet manifold 10 under the control of throttle valve 12 and fuel is injected by means of fuel pump B which delivers fuel to the injectors 14.

In the embodiment shown, ignition is effected by a high tension electrical ignition system of conventional form, the timing and distributing mechanism for the sparks being indicated generally at C and the high tension current being delivered through the cables 16 to the spark plugs located on the rear side of the engine.

The fuel pump B is driven in timed relation to the engine cycle and its timing is varied automatically in response to change in engine speed by means of the governing device indicated generally at D through which drive is transmitted to the pump from a rotary element bearing a fixed relation to the engine cycle, such as the engine crank shaft.

Governing mechanism D is shown on enlarged scale in Figs. 3 to 7 and will now be described.

In the embodiment illustrated, the mechanism is mounted on a shaft 18 which is coupled to and provides drive for the fuel pump. Shaft 18 is also provided with a worm gear drive 20 for driving the ignition timing device C. A gear 22 driven from the engine crank shaft meshes with a gear 24 loosely mounted on shaft 18 and provided with an elongated hub portion 24a.

Guide rails 26 (Fig. 7) are secured to the gear 24 by means of screws 28 and between these rails there is mounted a fork-shaped centrifugal weight 30 having prongs 30a extending past the hub of the gear and in sliding contact with the rails 26. As will be observed from Fig. 7, weight 30 may move outwardly under the influence of centrifugal force in a path formed between the guides 26.

Spring holders 32 are fixed near one end of each of the guide rails 26. A pin 34 passing through weight 30 and through slots in the guide rails, one of which slots is shown at 36, projects at its ends to provide spring holders 38. Between spring holders 32 and 38 are loading springs 40, one at each side of the device, the springs being of equal strength.

An element 42 is mounted for sliding movement between prongs 30a of weight 30. The function of this element will be described later.

Referring now more particularly to Figs. 3 and 4, member 44 is fixed by means of key 46 and nut 48 on the end of shaft 18. Member 44 provides guide rails 50 between which there is slidably mounted the forked centrifugal weight 52 having forks 52a guided by rails 50. Spring holders 54 are attached to guide rails 50 and pin 56 passing through weight 52 and through slots in guide rails 50, one of which slots is shown at 58, projects at its ends to provide spring holders 60. Between spring holders 54 and 60 are located the loading springs 62 of equal strength for weight 52.

Between the prongs 52a there is located the element 64 slidably mounted between these rails.

The centrifugal weights, sliding elements, and loading springs mounted on gear 24 and member 44 respectively are alike in form, weight, and strength.

Figure 7:
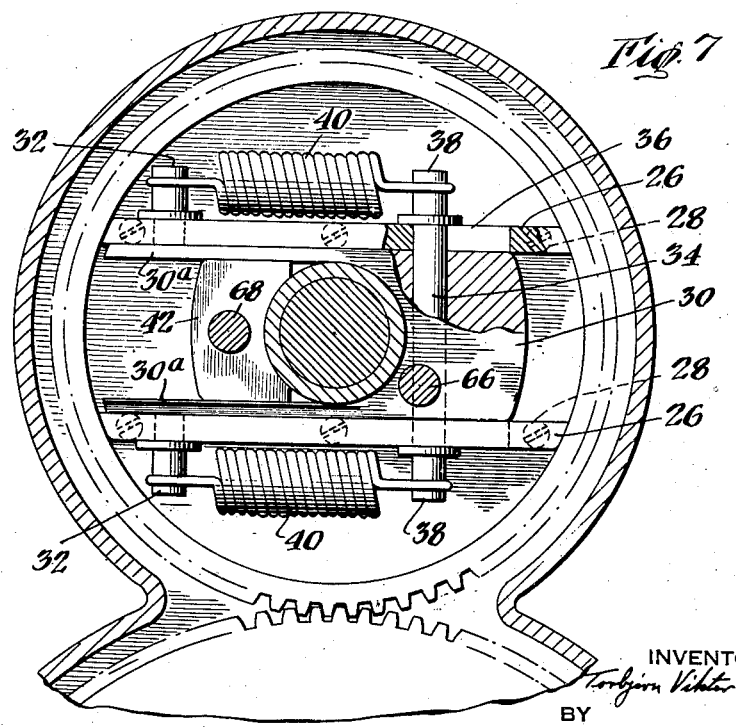
Fig. 7 is a section taken on the line 7—7 of Fig. 6.

The centrifugal weight 30 on gear 24 is connected to the sliding element or link block 64 on member 44 by means of a pin 66 (Fig. 5) and as will be observed from Figs. 4 and 7, this pin is located on the axis of symmetry of the link block and to one side of the axis of symmetry of the weight 30.

In similar manner, the weight 52 on member 44 is connected to the sliding element or link block 44 on gear 24 by means of a pin 68 which passes through the axis of symmetry of the link block and which is off-set with respect to the axis of symmetry of weight 52 (see Fig. 4). The manner of interconnection of these two sets of weights and link blocks will be evident from Figs. 4 and 6.

In Fig. 4, the device is shown in its position of rest with the centrifugal weights drawn inwardly as far as they will go by the loading springs. Under this condition, as will be observed from the figure, the respective sets of guides on the two members are angularly disposed with respect to each other, and it will further be appreciated from this figure that upon outward movement of the weights from the positions shown, will cause relative angular displacement between gear 24 and member 48, the direction of such displacement being such as to bring the respective sets of guide rails nearer parallelism, the further the weights move outwardly from their positions of rest. In other words, as the weights move outwardly, the angle α between the axis parallel to the guides 26 on gear 24 and the axis parallel to guides 50 on member 44 is progressively decreased as the weights move outwardly. If the direction of rotation of gear 24 be assumed to be in the direction indicated by arrow 70, it will be apparent that member 44, and with it the shaft 18 driving the pump, will be advanced with respect to the engine cycle as the speed of the engine increases and causes the weights to move outwardly under the influence of centrifugal force.

From the foregoing description it will be evident that the governing device just described provides simple and effective means whereby drive may be transmitted in variably timed relation to the fuel injecting means and also if desired, to the ignition means.

It will be appreciated that for this purpose, accuracy and reliability, as well as simplicity, are highly desirable factors and the above described governing device provides the qualities desired since the parts are relatively few and simple in their nature, the construction is rugged, and the large bearing areas provided minimize the possibilities of inaccuracy due to wear. Furthermore, the device may be applied to different engines requiring different characteristics for the curves of injection or ignition timing, simply by utilizing loading springs of different strengths.

Referring again to the method of injection control contemplated by the invention, it will be appreciated that in addition to timing the period of injection as a whole, control of the injection must be provided, in the case of variable load engines, to permit variable quantities of fuel to be injected in order to compensate for differences in load.

Load compensation is ordinarily accomplished by varying the length of the injection period and this may be accomplished either by maintaining the time of commencement of the injection period fixed in relation to the engine cycle at any given engine speed and varying the time of the end of the injection period at such speed, or by maintaining the time of the end of the injection period fixed in relation to the engine cycle at any given engine speed and varying the time of commencement of injection at such speed. In accordance with a more specific phase of the present invention I prefer to employ the latter type of control of the amount of fuel injected in combination with the variable timing of the injection period as a whole with respect to speed. The reason for this is that for each engine speed and regardless of load, the end of the injection period, which is the important factor here to be considered, is fixed with respect to the engine cycle. Consequently, in determining the setting and characteristics of the curve of injection advance with increase in speed, fixed points for each engine speed are all that need be considered and the curve may more readily be made to as closely as possible approach but not reach the self-ignition conditions at the different speeds than would otherwise be the case.

In Fig. 2 there is illustrated by way of example a form of construction in which this type of load control is employed. As will be seen from this figure, the shaft 18 operates the pump cam shaft 72 which in turn through tappets, one of which is shown at 74, actuates the individual pump plungers 76 in timed relation to the engine cycle. In this type of control, the quantity of the fuel injected per plunger stroke is determined by a control member 78 variably limiting the length of the suction stroke of the pump plunger, the plunger being provided with a by-pass channel 80 operating to release pump chamber pressure at a fixed point in the plunger stroke by registering with a fixed port in the pump barrel. The control element 78 may be actuated in any desired manner, manually or otherwise, and in the present embodiment this member is controlled by means of a piston mounted in a vacuum cylinder 82 connected by means of pipe 84 to the inlet manifold 10 of the engine.

The specific form of pump and load control therefor is not per se a part of the present invention and it will be understood that in so far as the timing of the injection means is concerned, the present invention may equally well be applied to injection systems in which timing of injection is not controlled by the pump but by some separate timing or distributing member, the timing of which with respect to the engine cycle is determined by the action of governing means D.

It is to be understood that the invention is not restricted to the specific application and apparatus hereinbefore described by way of illustration, but is to be considered as embracing all changes and variations in method and apparatus falling within the scope of the appended claims when they are construed as broadly as is consistent with the state of the prior art.

What I claim is:

1. The method of operating an internal combustion engine which includes the steps of compressing air in an engine cylinder, injecting fuel into the compressed air to form a combustible fuel-air mixture in the cylinder during the compression period, variably timing the injection in response to change in engine speed to maintain the time of the end of the injection period at any given engine speed in the normal working range of the engine in the vicinity of but later than the time at which conditions productive of self-ignition of injected fuel are produced at such engine speed, and igniting the mixture by timed ignition.

2. The method of operating an internal combustion engine which includes the steps of compressing air in an engine cylinder, injecting fuel into the compressed air to form a combustible fuel-air mixture in the cylinder during the compression period, timing the injection period so that in the upper portion of the normal speed range of the engine the end of the injection period occurs at a time in the engine cycle which would produce self-ignition of the fuel at lower engine speeds if injected at the same time in the engine cycle, retarding the time of injection in response to decrease in engine speed to maintain the time of injection later than that which is productive of self-ignition at the lower engine speeds, and igniting the mixture by timed ignition.

3. In the operation of an internal combustion engine of the kind in which fuel is injected into compressed air during the compression period and the resulting mixture ignited by timed ignition, that improvement which consists in compressing the air to a pressure sufficiently high to require the injection period to be terminated at low engine speeds relatively very late in the compression period to prevent self-ignition of the fuel, injecting the fuel at such speeds sufficiently late in the compression to prevent self-ignition, and advancing the timing of the injection period in response to change in engine speed to maintain the period of injection close to but not reaching the degree of advancement productive of self-ignition at the higher engine speeds.

4. The method of operating an internal combustion engine which includes the steps of compressing air in an engine cylinder, injecting fuel into the compressed air during the compression period and terminating the injection period sufficiently in advance of the end of the compression period at high speeds of engine operation to produce a combustible fuel-air mixture subject to self-ignition if formed at the same time in the engine cycle and with the engine operating at lower speeds, automatically retarding the termination of the injection period in response to decrease of engine speed from said high speeds to prevent self-ignition of the mixture formed at the lower speeds, and igniting the mixtures formed at both high and low speeds by timed ignition means.

5. The method of operating an internal combustion engine which includes the steps of compressing air in the engine cylinder, injecting fuel into the compressed air to form a combustible fuel-air mixture in the cylinder prior to the end of the compression period, varying the time of commencement of injection and maintaining the time of termination of injection constant with respect to the engine cycle at any given speed of the engine to compensate for change in load, varying the time of the end of the injection period with respect to the engine cycle in response to change in speed of the engine to retard the time of the end of injection as the speed of the engine decreases in its normal working range, and igniting the mixture by timed ignition means.

6. In an internal combustion engine, a cylinder, means for compressing air in the cylinder, timed fuel injection means for injecting fuel into the compressed air during the compression period to produce a combustible fuel air mixture in the cylinder for subsequent ignition by extraneous ignition means at a predetermined time in the engine cycle, timed ignition means for igniting said mixture and governing means responsive to change in speed of the engine for advancing the timing of the period of injection upon increase in speed of operation of the engine, said fuel injection means and said governing means being adjusted to cause injection of fuel in the high speed portion of the speed range of the engine so far in advance of the end of the compression period that self-ignition of the injected fuel would occur without the aid of said ignition means in the low speed range of operation of the engine and with the same degree of advance of timing of the fuel injection.

7. In an internal combustion engine, a cylinder, timed fuel injection means for injecting fuel into the cylinder during the latter part of the compression period to provide a preformed fuel mixture for subsequent ignition by extraneous ignition means, means for compressing air in said cylinder to a pressure sufficiently high to cause self-ignition of the injected fuel in the heated and compressed air in the cylinder at low engine speeds except when the period of injection at such speeds is effected very near the end of the compression period, timed ignition means for igniting said mixture, and governing means responsive to speed of operation of the engine for varying the timing of the period of fuel injection, said governing means and said fuel injecting means being adjusted to cause injection to be effected at low engine speeds very late in the compression period and to materially advance the timing of the period of injection upon increase in engine speed so that in the high speed portion of the range of operation of the engine, injection is completed relatively early in the latter portion of the compression period and at a time in the engine cycle such that self-ignition of the injected fuel would occur if the engine were operating with the same injection timing and in the low speed portion of its speed range.

8. In an internal combustion engine, a cylinder, timed fuel injection means for injecting fuel into the cylinder during the latter part of the compression period to provide a preformed fuel mixture for subsequent ignition by extraneous ignition means, means for compressing air in said cylinder to a pressure sufficiently high to cause self-ignition of the injected fuel in the heated and compressed air in the cylinder at low engine speeds except when the period of injection at such speeds is effected very near the end of the compression period, timed ignition means for igniting said mixture, governing means responsive to speed of operation of the engine for varying the timing of the period of fuel injection, said governing means and said fuel injecting means being adjusted to cause injection to be effected at low engine speeds very late in the compression period and to materially advance the timing of the period of injection upon increase in engine speed so that in the high speed portion of the range of operation of the engine, injection is completed relatively early in the latter portion of the compression period and at a time in the engine cycle such that self-ignition of the injected fuel would occur if the engine were operating with the same injection timing and in the low speed portion of its speed range, and means for varying the tim'ng of said timed ignition means to change the time of ignition substantially in accordance with the variations in the change in timing of the termination of injection.

9. In an internal combustion engine, a cylinder, means for compressing air in the cylinder, timed fuel injection means for injecting fuel into the compressed air during the latter portion of the compression period, means for varying the quantity of fuel delivered, the last mentioned means operating to maintain the end of the injection period constant with respect to the engine cycle and to vary the time of commencement of the injection period with respect to the engine cycle at any given engine speed, means for actuating said fuel injection means including a speed responsive device operating to advance the timing of the injection period with respect to the engine cycle as the engine speed increases, said speed responsive device being adjusted to cause injection of fuel to be completed in the high speed portion of the operating range of the engine so far in advance of the end of the compression period that self-ignition of the injected fuel would occur if the engine were operating in the low speed portion of its operating range and said speed responsive device operating to retard the time of completion of injection as the speed of the engine decreases to an extent preventing self-ignition of the fuel, and timed ignition means for igniting the fuel air mixture produced by the fuel injection.

10. In an internal combustion engine, a cylinder, means for compressing air in the cylinder, timed fuel injection means for injecting fuel into the compressed air during the latter portion of the compression period, means for varying the quantity of fuel delivered, the last mentioned means operating to maintain the end of the injection period constant with respect to the engine cycle and to vary the time of commencement of the injection period with respect to the engine cycle at any given engine speed, means for actuating said fuel injection means including a speed responsive device operating to advance the timing of the injection period with respect to the engine cycle as the engine speed increases, said speed responsive device being adjusted to cause injection of fuel to be completed in the high speed portion of the operating range of the engine so far in advance of the end of the compression period that self-ignition of the injected fuel would occur if the engine were operating in the low speed portion of its operating range and said speed responsive device operating to retard the time of completion of injection as the speed of the engine decreases to an extent preventing self-ignition of the fuel, and variably timed ignition means adjusted to ignite said mixture substantially immediately upon completion of injection throughout the normal speed range of the engine.

TORBJÖRN VIKTOR DILLSTRÖM.

CERTIFICATE OF CORRECTION.

Patent No. 2,145,250. January 31, 1939.

TORBJÖRN VIKTOR DILLSTRÖM.

It is hereby certified that error appears in the above numbered patent requiring correction as follows: Page 1, upper left-hand corner, for "Registered Jan. 31, 1939" read Patented Jan. 31, 1939; and that the said Letters Patent should be read with this correction therein that the same may conform to the record of the case in the Patent Office.

Signed and sealed this 4th day of April, A. D. 1939.

Henry Van Arsdale (Seal) Acting Commissioner of Patents.